Dec. 25, 1945.  E. E. SCHOESSOW  2,391,747
PENSTOCK AND METHOD OF FABRICATING PENSTOCKS
Filed Aug. 26, 1942
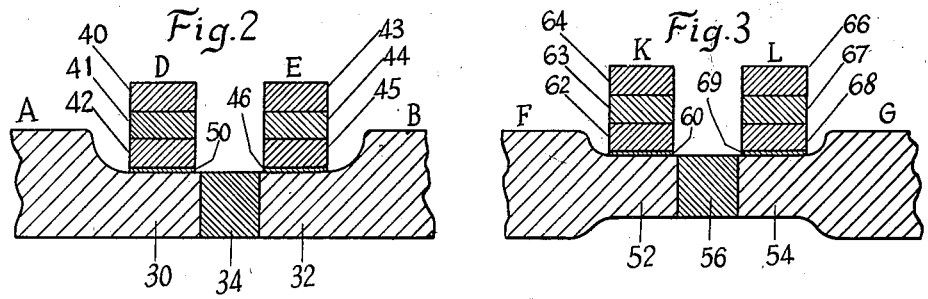
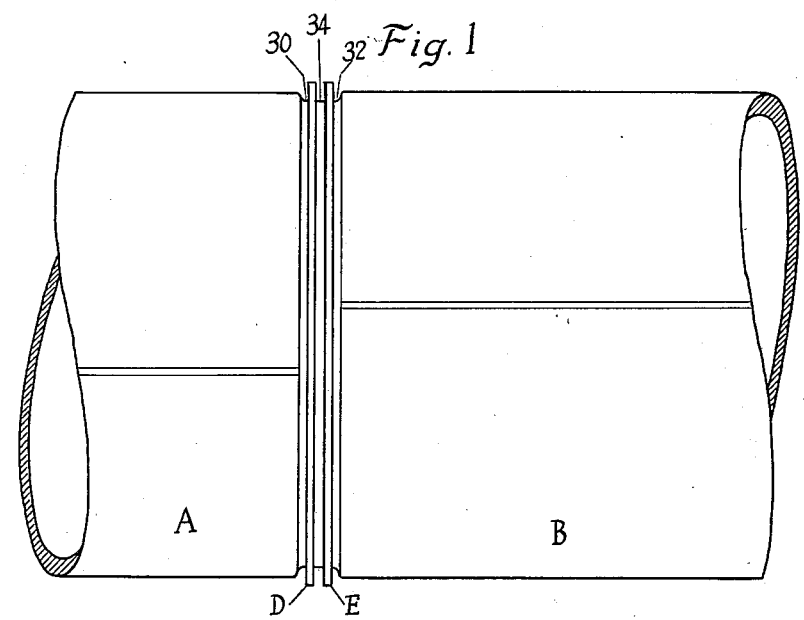
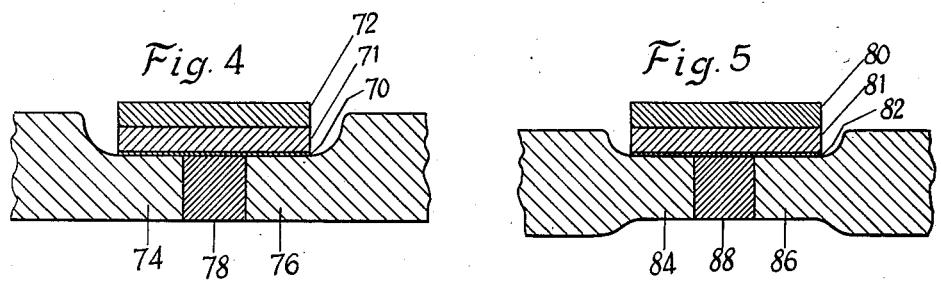
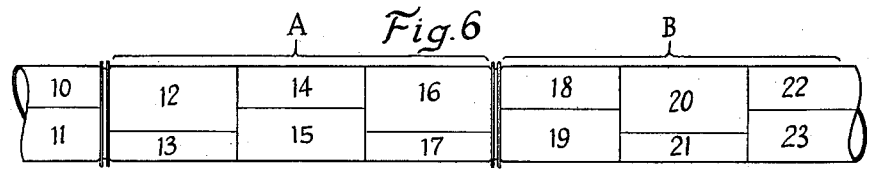
INVENTOR.
EARL E. SCHOESSOW
BY
ATTORNEY Patented Dec. 25, 1945

2,391,747

UNITED STATES PATENT OFFICE 2,391,747

PENSTOCK AND METHOD OF FABRICATING PENSTOCKS

Earl E. Schoessow, Barberton, Ohio, assignor to The Babcock & Wilcox Company, Newark, N. J., a corporation of New Jersey Application August 26, 1942, Serial No. 456,209

4 Claims. (Cl. 285—111)

This invention relates to the manufacture of heavy metallic structures and to a welding method for such manufacture.

The invention may be also considered as represented by metallic structures such as penstocks or pressure vessels subject internally to high fluid pressures, and therefore of heavy wall structure to withstand those pressures. Such structures include heavy plate sections formed to the contour of a part of the ultimate product and then welded together to form the ultimate structure or a large component thereof. The latter may be a penstock structure, hundreds of feet in length, and of such diameter and wall thickness that even a 20 foot length is of great weight. Diameters and wall thicknesses may be of such orders that the limitations of shop procedure and transportation practices compel the separate shop fabrication of relatively short sections, and the subsequent welding together of the shop-fabricated sections, in situ, or in the field.

The welding of such thick plate sections sets up substantial local stresses in the adjacent metal, but when the fabricated section is not too large such stresses can be eliminated by heat treatment of the section in the shop. However, when such heat treated sections are welded together in the field the problem of eliminating the local stresses induced by the welding (and subsequent cooling) is not usually susceptible of the same solution. It is an object of the invention to provide such a method of joining such shop fabricated sections in the field that the consequent local stresses are so limited that stress-relieving treatment is not necessary.

The invention will be described in connection with the accompanying drawing, and other objects of the invention will appear as the description proceeds.

In the drawing:

Fig. 1 is an elevation showing the field welded union of two shop fabricated components;

Fig. 2 is a section transversely of the field weld. This figure also indicates the reduced plate sections adjacent the field weld with the groups of tension bands disposed around the shell at the reduced sections;

Fig. 3 is a section of a welded structure formed in a manner similar to that indicated in Fig. 2, but involving a reduction of the plate thickness of the shop fabricated components in such a manner that the axis of the reduced sections coincides with the axis of the thick plate section;

Fig. 4 is a section through a field weld, indicating the tension bands as covering the field weld as well as the adjacent reduced sections of the shop fabricated components.

Fig. 5 is a section indicating a manner of fabrication similar to that in Fig. 4 but with the edges of the shop fabricated components being reduced from both sides of the plates; and Fig. 6 is an elevation indicating a plurality of shop welded and fabricated components joined by a plurality of the illustrative field connections.

The invention takes advantage of the facts that the undesirable effect of weld created stresses increases with the depth of the weld, or the thickness of the sections welded, and that when the section thickness does not exceed a predetermined value the residual stress concentrations do not exceed allowable limitations.

The invention accordingly provides for the substantial reduction of the plate thicknesses at the positions of field welding. The loss of hoop strength by such reduction is compensated by tension bands about the zone of field welding. These bands may, in some instances, cover the welds.

In Fig. 6 of the drawing, components A and B are fabricated in the shop and they approach, in size, the maximum for shop production. They consist of heavy plate sections such as 10-23, inclusive, formed to contour and welded together to form successive tubular sections. Because of the thickness of the plate, the shop welds are deep and the local stresses resulting from the shop welding are such that the welded tubular sections must be stress-relieved after they are completed. Such stress-relieving is usually accomplished by heat treatment in furnaces, and the size of such furnaces is a limitation upon the size of the components A and B.

Before the components leave the shop, the plate thickness of their ends is reduced. This reduction in plate thickness may be accomplished from one side of the plate only as indicated in Figs. 2 and 4. In this case, the continuity of the inner shell is maintained in the completed structure to avoid flow disturbances. In cases where flow disturbances are not major considerations, reduction in plate thickness is accomplished from both sides of the plate to obtain the design advantage of having the center line of the thinner plate sections to coincide with the center line of the thicker sections. The arrangements of the elements at the field welds made under such conditions are indicated in Figs. 3 and 5.

The shop fabricated sections such as A and B may be utilized in penstocks. They are transported to the penstock location and adjacent sections are aligned in end to end relationship so that the thin plate end portions 30 and 32 of Fig. 2 are spaced apart to form a groove or cleft for the weld 34. While the components are held in this relationship the weld 34 is completed, the thickness of the plate of the sections 30 and 32 being such that all local stresses due to the production of weld 34 do not demand stress-relieving.

To compensate for the loss of hoop strength at the reduced portions 30 and 32 and to compensate, at least in part, for the limited local stresses caused by the production of the weld 34, steel bands are applied around the shell at the reduced sections 32 and adjacent the weld 34. These bands are separately and successively applied.

Before the inner band 42 is applied, a backing-up strip 50 is disposed upon the reduced portion 30. This strip may not extend all the way around the shell, but it is desirable that it approach encirclement of the shell. It is important that this strip extend across the weld by which the band 42 is completed. The band may consist of a strip or bar bent around the shell and held in tightly fitting relationship while its adjacent ends are welded. The contraction of the band following the heating consequent to the welding tightens the band over the backing-up strip 50 and causes both band and strip to tightly fit the shell. Subsequently, the band 41 is similarly constructed in tightly fitting relationship around the band 42 and in some instances a third band 40 is similarly applied.

The bands described above may be considered as constituting the band group D which is shown as closely adjacent the weld 34 and at one side thereof. Subsequently, the bands or strips 43—46 of the group E are similarly applied at the opposite side of the weld 34.

In cases where the flow disturbances within the completed structure are not important, the thick plate tubular sections, such as those indicated at F and G in Fig. 3, may be reduced from both sides as indicated at 52 and 54. Under such conditions, it is of mechanical advantage to have the center lines of the reduced sections 52 and 54 to coincide with the center lines of the sections F and G.

After the components including the sections F and G are aligned as indicated in Fig. 3 the weld 56 is completed and groups K and L of the bands are applied in the same manner as that indicated in the description of the procdure indicated in Fig. 2. The group K includes the backing-up strip 60 and the bands 62—64, while the bands 66—68 and the backing-up strip 69 constitute the group L.

In some cases, the shell encircling bands may be wide enough to cover the thinned plate sections as well as the intervening field weld, such arrangements being indicated in Figs. 4 and 5. In Fig. 4, the wide strip 70 and the bands 71 and 72 cover the reduced plate sections 74 and 76 and the intervening field weld 78, while in the Fig. 5 arrangement, the strip 80 and the wide bands 81 and 82 cover the reduced sections 84 and 86 and the intervening field weld 88. These constructions including wide bands are theoretically effective, assuming the bands are tightly fitted and that the inner band maintains contact over the entire surface. To be effective this would necessitate extremely accurate machining and matching of the two sections of the joint and it would also necessitate the accurate machining of the surface of the field weld to line up with the surface of the reduced plate sections.

Although the invention as described is of particular advantage in the construction of penstocks, the invention is also of advantage in any other fabrications using cylindrical sections and requiring field welded circumferential joints the stress-relieving of which is not feasible, or economical.

It is to be appreciated that the invention has been described with reference to the details of procedure applicable to the structures shown in the drawing but it is to be understood that the invention is of such a scope that it need not always involve all of those details. The invention is rather to be considered as of a scope commensurate with the scope of the subjoined claims.

I claim:

1. A method of fabricating tubular structures subject, in use, to fluids under high pressures; said method including the shop welding of thick plates to form tubular components of the ultimate structure, working the metal to form cylindrically surfaced end sections of reduced thickness to constitute field junction edges of said components, juxtaposing successive tubular components in situ with the reduced sections forming the sides of weld grooves, field welding the sections by the deposition of weld metal in said grooves, and tightly fitting superposed steel bands about said cylindrical end portions immediately adjacent circumferential edges of the field welds by subjecting the bands and the reduced sections to differential thermal conditions, the radial thickness of the band reenforcement being greater than the radial extent of the reduction at the field junction edges of the components to compensate for the loss of hoop strength occasioned by the reduction of plate thickness.

2. In a welded tubular structure, adjacent tubular sections of heavy wall thickness, said sections having ends of reduced thickness and smaller outside diameters, said reduced ends being of such thickness that the sections may be joined at the ends by field welds without subsequent heat treatment, the outside surfaces of said reduced end sections having cylindrical surfaces, reinforcing hoops tightly fitting the outer surfaces of the reduced end portions, and circumferential welds joining the reduced ends of the tubular sections at positions between the reinforcing hoops of adjacent sections.

3. A method of fabricating tubular structures subject, in use, to fluids under high pressures; said method including the shop welding of thick plates to form tubular components of the ultimate structure, reducing the end portions of the components and forming them with outside cylindrical surfaces of an outside diameter less than the outside diameter of the main parts of the tubular components, the reduced end portions being of such thickness that the tubular components may be joined by field welding without creating such local stresses that subsequent stress-relieving treatment is necessary, juxtaposing and aligning successive sections in situ with the reduced portions forming the sides of weld grooves, field welding the components by fusing weld metal in said grooves, and tightly fitting steel bands about the welded components at positions immediately adjacent the opposite circumferential edges of each field weld by subjecting the bands and the reduced portions to differential thermal conditions, said band re-enforcement being formed with a radial thickness greater than the radial extent of the reduction of said end portions to compensate for the loss of hoop strength occasioned by the reduction of plate thickness, the fitting of the bands being initiated by disposing a band at the position of maximum thickness reduction of said end portions.

4. In a welded tubular structure, adjacent tubular sections of heavy wall thickness, said sections having end portions of reduced thickness and of outside diameters less than the main body portions of the sections, said reduced end portions being of such thickness that the sections may be joined at the ends by field welds without creating local stresses of such degree that subsequent heat treatment is necessary, the outside surfaces of said reduced end sections being cylindrical surfaces, circumferential welds joining the tubular reduced end portions of the tubular sections, and reinforcing hoops tightly fitting around the reduced end portions and bearing upon the tubular portions of maximum wall thickness reduction, the radial thickness of the hoop reenforcement being in each instance greater than the radial extent of the reduction in wall thickness of the sections.

EARL E. SCHOESSOW.